United States Patent Office 3,029,288
Patented Apr. 10, 1962

3,029,288
PREPARATION OF ALDEHYDES BY
CATALYTIC OXIDATION
Robert W. Etherington, Jr., Pennington, N.J., assignor to Petro-Tex Chemical Corporation, Houston, Tex., a corporation of Delaware
No Drawing. Filed Mar. 13, 1959, Ser. No. 799,102
4 Claims. (Cl. 260—604)

This invention relates to an improved process for the manufacture of aldehydes by catalytic oxidation of hydrocarbons and relates more particularly to an improved process for producing unsaturated aliphatic aldehydes by reacting a mixture of an olefinic hydrocarbon and air in the presence of a novel catalyst.

Production of aliphatic aldehydes by vapor phase catalytic oxidation of hydrocarbons is known. The principal method currently employed for making acrolein and methacrolein is by the catalytic oxidation of propylene and isobutylene in the presence of such catalysts as the copper oxides. High yields are generally not obtained with these catalysts, requiring large recycle streams.

It is an object of this invention to provide an improved process for obtaining aldehydes by vapor phase oxidation of hydrocarbons. It is another object of this invention to provide an improved process for the vapor phase oxidation of mono-olefins, particularly propylene and isobutylene to acrolein and methacrolein, in improved yields. It is a further object of this invention to provide a novel and improved catalyst useful in obtaining increased yield of product by vapor phase catalytic oxidation of olefins to unsaturated aliphatic aldehydes, and methods for making the same. Other objects and advantages of the invention will be apparent from the description thereof which follows.

It has been found, quite unexpectedly, that a complex vanadium - boron - phosphorous - oxygen-containing compound, prepared by methods hereinafter described, is an effective catalyst in converting olefins such as propene and isobutylene to unsaturated aliphatic aldehydes such as acrolein and methacrolein at good yields under the reaction conditions set forth hereinafter. Better selectivity is realized with this catalyst than with similar catalysts not containing boron.

In order to obtain optimum results from the novel catalyst of this invention, the vanadium, boron and phosphorous should be present in the catalyst in ratios of one gram atom of vanadium, about one-half to about four gram atoms of phosphorous and about 0.01 to one gram atom of boron. More preferably the catalyst contains vanadium, phosphorous and boron in gram atomic ratios of one gram atom of vanadium, one to two gram atoms of phosphorous and about one-tenth to one-half gram atom of boron.

The catalyst may be considered as a vanadyl borate phosphate, a mixture of vanadium oxyphosphate-oxyborate, as a mixture of oxides as $V_2O_5$, $P_2O_5$ and $B_2O_3$ or as a complex heteropoly acid or salt thereof. Although the catalyst may be formed into pellets, it is more economical and practical to deposit this material on an inert carrier. The amount of catalyst on the carrier may be varied from about 5 to about 60 weight percent, but more preferably is from about 10 to about 30 weight percent on an inert carrier such as Alundum.

The novel vanadyl borate phosphate catalyst of this invention may be prepared in a number of ways. For example vanadium oxysalts such as the oxychlorides, which are readily obtained as by dissolving vanadium pentoxide in concentrated hydrochloric acid is reacted with boric and phosphoric acid. The resulting vanadyl borate phosphate is then deposited from solution on an inert carrier such as Alundum. The treated Alundum has thereon a uniform coating of the vanadium-oxyphosphate-oxyborate complex which substantially completely covers the surface of the Alundum.

The amount of vanadyl borate phosphate deposited on the carrier should be enough to substantially coat the surface of the carrier and this normally is obtained with the ranges set forth above. With more absorbent carriers, larger amounts of material will be required to obtain essentially complete coverage of the carrier. In the case of silicon carbide, about 25 percent vanadyl borate phosphate is normally used. Excess vanadyl borate phosphate, over that required to coat the carrier surface, is not necessary and usually will be lost by mechanical attrition.

One satisfactory procedure for preparing a typical catalyst of this invention is as follows. Vanadium pentoxide is dissolved slowly and carefully in concentrated hydrochloric acid and the mixture warmed slowly. After the initial reaction the mixture is refluxed until a clear blue solution of the homogeneous complex of vanadyl chlorides (vanadium oxychloride) is obtained. Boric oxide or boric acid is then dissolved in the vanadium oxychloride and refluxed. Concentrated phosphoric acid is then added to the solution of vanadium oxychlorides and boron compound and the mixture again refluxed. The two acids may be added together. This solution is then concentrated to a point just above saturation. The complex vanadium-oxyphosphate-oxychloride-oxyborate, is the major constituent of the solution. The vanadium in this complex probably has an oxidation state or valence of four to five. To the hot concentrated solution there is added Alundum which has been extracted with concentrated hydrochloric acid, washed with distilled water and dried. This mixture is treated by combined heating, tumbling and stirring to obtain a free flowing catalytic material. The drying should proceed slowly and carefully so as to not destroy the uniform coating of vanadium-oxyphosphate-borate on the surface of the Alundum.

The novel catalysts of the invention can also be readily prepared, in addition to the preferred procedure set forth above, by dissolving vanadium pentoxide and boric oxide or boric acid in hydrogen iodide or hydrogen bromide. Likewise, the anhydride of phosphoric acid, $P_2O_5$, may be employed in place of phosphoric acid. In addition vanadium oxychloride, other vanadium salts which contain an anion derived from an acid which is more volatile than phosphoric acid and which is not an oxidizing agent may be used in place of vanadium oxychloride. Thus, the oxysalts of hydriodic acid, hydrobromic acid, acetic acid, and less desirably, hydrofluoric acid and sulfuric acid and the like may be employed. Hydrochloric acid and vanadium pentoxide, or vanadium oxychloride itself or equivalent oxysalts such as the oxybromide or oxyiodide regardless of how prepared, are employed because of the economics and ease of preparation and use thereof to make the defined catalyst. Dilute acids, both hydrochloric and phosphoric, or dilute solutions of the vanadium salts and boron compound may be employed, but this is normally not desirable since large volumes of material have to be handled and it is more costly and time consuming to remove the excess water. Boron oxide, boric acid and the halides may be employed in preparing the catalyst. The catalyst also may be prepared, for example, by concentrating ammonium vanadate, ammonium phosphate and boric acid onto an inert support. Normally, the solution of vanadium oxyphosphate-borate is concentrated to a saturated solution and the Alundum or other inert carrier added thereto. This is for expediency and more dilute solutions may be employed although longer periods of time to obtain the dried catalyst material are required. The Alundum may be present during the whole course of reactions to provide the desired vanadium oxyphosphate-borate complex.

The support or carrier for the vanadium-phosphate-borate complex should be inert to both the depositing solution containing the vanadium oxyphosphate-borate and inert under the catalytic oxidation conditions, and provides not only the required surface for the catalyst but gives physical strength and stability to the catalyst material. The carrier or support preferably has a low surface area, as usually measured, from about 0.01 to about 5 to 10 square meters per gram. A desirable form of carrier is one which has a dense non-absorbing center and a rough enough surface to aid in retaining the catalyst adhered thereto during handling and under reaction conditions. The carrier may vary in size, but preferably is from about 2 mesh to about 10 mesh. Alundum particles as large as ¼ inch are satisfactory, and carriers much smaller than 10 to 12 mesh normally cause an undesirable pressure drop in the reactor. Very useful carriers are Alundum and silicon carbide or Carborundum. Any of the Alundums or other inert alumina carriers of low surface area may be used. Likewise a variety of silicon carbides may be employed. Silica gel had been used. Although more economical use of the catalyst on a carrier in fixed beds is obtained, the catalyst may be employed in fluid bed systems. Of course, the particle size of the catalyst used in fluidized beds is quite small, and in such systems the catalyst normally will not be provided with a carrier but will be formed into the desired particle size after drying from solution.

The reaction involving vapor phase oxidation of hydrocarbons and olefins to aliphatic aldehydes requires only passing the olefin in low concentrations in air over the described catalyst. Once the reaction is begun it is self-sustaining because of the exothermic nature thereof. Under normal conditions the life of the novel catalyst of this invention is excellent.

Fixed bed reactors have been found to be satisfactory for the catalytic oxidation of olefins to aldehydes with the novel catalyst of this invention. A variety of reactors will be found to be useful and multiple tube heat exchanger type reactors are quite satisfactory. The tubes of such reactors may vary in diameter from about ¼ inch to about 2 inches and the length may be varied from about 3 to about 6 or more feet. The oxidation reaction is an exothermic reaction and the catalyst of this invention is somewhat heat sensitive so that relatively close control of the reaction temperature should be maintained. It is desirable to have the surface of the reactors at a relatively constant temperature and some medium to conduct heat from the reactors is necessary to aid in eliminating hot spots and the like. Such media may be Woods metal, molten sulfur, mercury, molten lead and the like. It has been found that eutectic salt baths are completely satisfactory. One such salt bath is a sodium nitrate-sodium nitrite-potassium nitrate eutectic constant temperature mixture. As will be recognized by the man skilled in the art, the heat exchange medium will be kept at the proper temperature by heat exchangers and the like. The reactor or reaction tubes may be stainless steel, carbon-steel, nickel, glass tubes of the type known as Vycor, a high silica glass, and the like. Both carbon-steel and nickel tubes have excellent long life under the conditions of the reactions described herein. Normally, the reactors contain a preheat zone of an inert material such as ¼ inch Alundum pellets, inert ceramic balls, nickel balls or chips and the like, present at about one-half to one-fourth the volume of catalyst present.

The temperature of the reaction may be varied within some limits, but normally the reaction should be conducted at temperatures within a rather critical range. The oxidation reaction is exothermic and once the reaction is underway, the main purpose of the salt bath or other media is to conduct heat away from the walls of the reactor and control the reaction. Better operations are normally obtained when the temperature employed is no greater than about 20° above that temperature, under a given set of conditions, at which optimum conversion to acrolein and methacrolein is obtained. The temperature in the reactor, of course, will depend to some extent upon the size of the reactor and the olefin concentration. Under usual operating conditions, in compliance with the preferred procedure of this invention, the temperature in the center of the reactor, measured by thermocouple, is about 550° C. with isobutylene in air at a concentration of about 1.25 mole percent and at a flow rate of about 150 grams of isobutylene per liter catalyst hour. The range of temperature of reactions which preferably are employed in the reactor, measured as above, should be in the range of about 475° C. to about 650° C. Described another way, in terms of salt bath reactors with carbon steel or nickel reaction tubes, about one inch in diameter, at the defined flow rate and butene concentrations, the salt bath temperature should be controlled between about 425° C. to about 575° C. In any case, the optimum reaction temperature and/or salt bath temperature for maximum yield of desired aldehyde is readily ascertained and should be observed. Under normal conditions, the temperature in the reactor ordinarily should not be allowed to go above about 600° for extended lengths of time because of possible deactivation of the novel catalyst of this invention.

The aldehydes may be recovered by a number of ways well known to those skilled in the art. For example, by direct condensation or by absorption in suitable media, with subsequent separation and purification of the aldehyde by methods known to those skilled in the art.

Although the novel catalyst of this invention may be prepared in a number of ways, the catalysts used in the following examples were prepared by means of one of two methods. In the first method, vanadium pentoxide is dissolved in concentrated hydrochloric acid and the mixture refluxed for a period of time. Thereafter boric acid or boric oxide and phosphoric acid or phosphorous pentoxide were added to the solution of vanadium oxychloride and the mixture refluxed again to obtain the boron containing vanadium oxyphosphate. In another procedure, ammonium meta-vanadate is treated with nitric acid to form vanadium oxide which is then dissolved in concentrated hydrochloric acid and the vanadium oxyphosphate-borate formed as described above. The complex vanadium borate phosphate catalyst is then deposited from concentrated solution on inert carriers such as Alundum, silicon carbide, and the like which have been pretreated with concentrated hydrochloric acid, by a combined heating, tumbling, and stirring action at a temperature to obtain slow and gradual drying of the active material to a concentration of active catalyst material of about 15 to 25 percent on the carrier.

The test reactors employed were ¾ inch stainless steel tubes in a metal block. The length of the reactor tubes was approximately 3½ feet. The bottom of the reactors were filled with inert Alundum pellets and 150 milliliters of catalyst placed in the reactor and the remainder of the tube was filled with Alundum pellets. The air in the hydrocarbon feed streams was metered into a mixing chamber. The catalysts were placed in the reactor at about 300° C. and were activated in a stream of air containing 0.5 percent isobutylene while the temperature of the reactor was slowly raised to 500° C. over a period of 24 to 36 hours.

In an embodiment of the invention 47 grams of vanadium pentoxide was digested in an excess of concentrated hydrochloric acid until a clear solution was obtained. 83.2 grams of 85 percent phosphoric acid was added to the clear solution. The resulting mixture was digested at reflux temperature for one hour. 3.2 grams of boric acid was then added to the reaction mixture and digestion continued at reflux temperature for another hour. The solution was concentrated to near saturation and 400 grams of 4 to 8 mesh silicon carbide was added and the catalyst deposited thereon by combined heating, tumbling and stirring to obtain slow and gradual drying of active material on the silicon carbide. 20 percent active catalyst was deposited on the silicon carbide. This catalyst contained vanadium, phosphorous and boron in gram atomic ratios of one gram atom of vanadium, 1.4 gram atoms of phosphorous and 0.1 gram atom of boron. The catalyst was placed in the reactor described above and 1.1 volume percent isobutylene in air was passed therethrough at a rate of 111 grams per liter catalyst hour, at a contact time of 0.9 second, at 490° C. A yield of 32 mole percent methacrolein was obtained. When 1.8 volume percent isobutylene in air was reacted at a throughput of 188 grams per liter catalyst hour, contact time 0.9 second, at 530° C., a 37 mole percent yield of methacrolein was obtained. Conversion of isobutylene was essentially complete in both cases. When the volume percent isobutylene in air was increased to 2.3 at a throughput of 121, a contact time of 1.7 seconds and 515° C., a yield of 37 mole percent yield of methacrolein was obtained. Conversion was 86 percent and selectivity was 43 percent. The presence of boron oxides results in catalysts of greater selectivity for the formation of aldehydes with less acid, carbon dioxide and carbon monoxide being formed than similar catalysts not containing boron.

Another catalyst was prepared following the procedure outlined above. 23.9 grams of vanadium pentoxide, 39.3 grams of 85 percent phosphoric acid and 3.25 grams of boric acid were reacted and deposited on 200 grams of silicon carbide to obtain 20 percent actives on the carrier. This catalyst contained vanadium, phosphorous and boron in a ratio of one gram atom of vanadium, 1.3 gram atoms of phosphorous and 0.2 gram atoms of boron. At a concentration of one volume percent in air and an isobutylene throughput of 90 grams per liter catalyst hour at a contact time of one second at 490° C., a conversion of isobutylene to methacrolein of 35.4 mole percent was obtained. The selectivity was 47 percent with a conversion of 75 percent.

The gaseous feed stream to the oxidation reactors normally will contain air and about one-half to about three mole percent hydrocarbons such as isobutylene or propylene. About 1.2 to about 1.5 mole percent of the monoolefin are satisfactory for optimum yield of product for the process of this invention. Although higher concentrations may be employed, it should be noted that explosive hazards may be encountered at higher concentrations. Concentrations of isobutylene less than about one percent, of course, will reduce the total yields obtained at equivalent flow rates and thus are not normally economically employed.

Air is entirely satisfactory for use with the olefin but it will be understood that synthetic mixtures of oxygen and inert gases, such as nitrogen, or steam also may be employed. The flow rate of the gaseous stream through the reactor may be varied within rather wide limits but a preferred range of operations is at the rate of about 50 to 300 grams of olefin per liter of catalyst per hour and more preferably about 100 to about 250 grams of olefin per liter of catalyst per hour. Residence times of the gas stream will normally be less than about 2 seconds, more preferably less than about one second, and down to a rate, which is easily determined, that less efficient operations are obtained.

I claim:
1. A process for the preparation of unsaturated aliphatic aldehydes which comprises passing at a temperature in the range of about 475° C. to 650° C. a gaseous mixture of a hydrocarbon selected from the group consisting of propylene and isobutylene and oxygen through a tubular reactor containing a vanadium oxyphosphate-oxyborate catalyst complex wherein said catalyst complex contains vanadium, phosphorous and boron in a ratio of 1 gram atom of vanadium, 1 to 2 gram atoms of phosphorous and 0.01 to 0.5 gram atoms of boron, said gaseous mixture containing from about one-half to about three mole percent of the said hydrocarbon.

2. A process for the preparation of methacrolein which comprises passing at a temperature in the range of about 475° C. to 650° C. a gaseous mixture of isobutylene and oxygen through a tubular reactor containing a vanadium oxyphosphate-oxyborate catalyst complex wherein said catalyst complex contains vanadium, phosphorous and boron in a ratio of 1 gram atom of vanadium, 1 to 2 gram atoms of phosphorous and 0.01 to 0.5 gram atoms of boron, and is coated onto an inert carrier, said gaseous mixture containing about one-half to about three mole percent isobutylene.

3. A process for the preparation of methacrolein which comprises passing at a temperature in the range of about 475° C. to 650° C. a gaseous mixture of isobutylene and oxygen through a tubular reactor containing a catalyst complex wherein said catalyst complex contains vanadium, phosphorous and boron in a ratio of 1 gram atom of vanadium, 1 to 2 gram atoms of phosphorous and 0.01 to 0.5 gram atoms of boron, said catalyst having been prepared by reacting in solution a vanadium oxysalt, a boron compound selected from the group consisting of boric acid and boron oxide and a phosphorous compound selected from the group consisting of phosphoric acid and $V_2O_5$ to form the catalyst complex and thereafter depositing said complex onto an inert carrier, said gaseous mixture containing about one-half to about three mole percent isobutylene.

4. A process for the preparation of methacrolein which comprises passing at a temperature in the range of about 475° C. to 650° C. a gaseous mixture of isobutylene and oxygen through a tubular reactor containing a catalyst complex wherein said catalyst complex contains vanadium, phosphorous and boron in a ratio of 1 gram atom of vanadium, 1 to 2 gram atoms of phosphorous and 0.01 to 0.5 gram atoms of boron, said catalyst complex having been prepared by reacting in an aqueous hydrochloric acid solution a vanadium oxychloride, a boron compound selected from the group consisting of boric acid and boron oxide and a phosphorous compound selected from the group consisting of phosphoric acid and $P_2O_5$ to form a catalyst complex and thereafter depositing said complex onto an inert carrier, said gaseous mixture containing about one-half to about three mole percent isobutylene.

References Cited in the file of this patent
UNITED STATES PATENTS

| | | |
|---|---|---|
| 2,020,671 | Dreyfus | Nov. 12, 1935 |
| 2,524,810 | Kimberlin | Oct. 10, 1950 |
| 2,659,758 | Detling et al. | Nov. 17, 1953 |
| 2,662,921 | Middleton | Dec. 15, 1953 |
| 2,734,874 | Drake et al. | Feb. 14, 1956 |
| 2,773,921 | Rylander et al. | Dec. 11, 1956 |